July 25, 1944.  V. K. ZWORYKIN ET AL  2,354,287
DYNAMIC METHOD OF CORRECTING THE SPHERICAL
ABERRATION OF ELECTRON LENS
Filed April 20, 1942
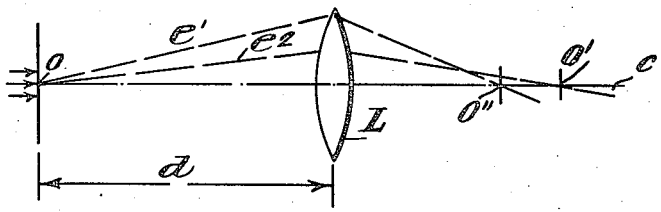
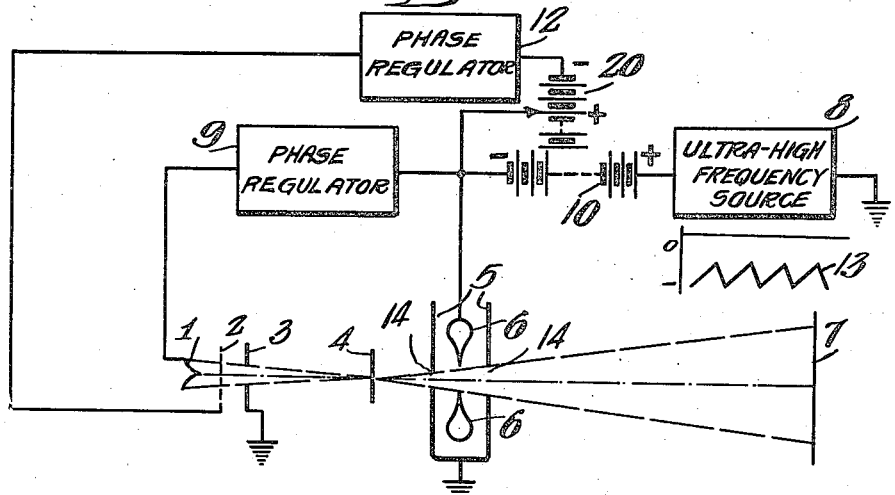
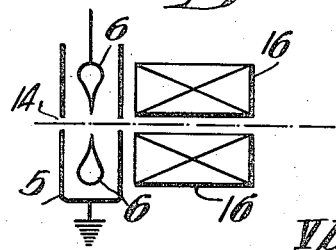
INVENTORS
Vladimir K. Zworykin
James Hillier
& Edward G. Ramberg
By
C.D. Tuska
Attorney Patented July 25, 1944

2,354,287

UNITED STATES PATENT OFFICE 2,354,287

DYNAMIC METHOD OF CORRECTING THE SPHERICAL ABERRATION OF ELECTRON LENSES

Vladimir K. Zworykin, Philadelphia, Pa., James Hillier, Collingswood, N. J., and Edward G. Ramberg, Feasterville, Pa., assignors to Radio Corporation of America Application April 20, 1942, Serial No. 439,642

20 Claims. (Cl. 250—49.5)

This invention relates generally to electron lenses and particularly to a method and means for correcting spherical aberration in electron lenses.

The primary factors which have, in the past, limited the resolving power of electron microscopes are the spherical aberration or aperture defect, and the chromatic aberration of the microscope objective. Prior to this invention there have been no entirely satisfactory methods of correcting either form of aberration. The invention pertains to means for nullifying effectively the diffusion of the image produced by spherical aberration and therefore permits greater image resolution than has been possible heretofore.

Electrons leaving a predetermined point on the object travel at different angles with respect to the electron beam axis, and therefore require different time intervals to reach the electron refracting field of the objective lens. If, for the purpose of illustration, the objective lens is assumed to be a plane surface, electrons passing through the object and travelling along the electron beam axis will reach the objective lens earlier than electrons leaving the same point on the object and travelling along a longer path at some predetermined angle with the beam axis. In other words, the electrons leaving a point of the specimen on the beam axis at any instant can be considered to constitute a thin expanding spherical shell of electrons which intersects the plane of the objective lens in an expanding circle.

It is well known that in ordinary electron lenses of either the electrostatic or electromagnetic type, the inherent spherical aberration is a function of the distance from the lens axis of the electron path within the lens refracting field. Electrons which enter the lens field at a distance from the lens axis are deflected more strongly than in proportion to this distance, hence the intersection of these electrons with the lens axis occurs at different points, causing what is commonly termed "spherical aberration." It is therefore apparent that, for ordinary electron lenses having a constant potential, each zone of the lens has a different effective focal length. This invention contemplates varying the effective focal length of the lens periodically in order that all electrons leaving the object at a given instant may be refracted to a common focus. The method and means for accomplishing this effect operates on the principle that the object will be irradiated by the electron beam in a discontinuous manner by modulating the electron stream, and then varying the strength of the objective lens field, in synchronism with the modulation of the beam, to present a lens of constant focal length throughout all zones to electrons entering the lens field at all angles with respect to the lens axis from a given object point.

Due to the inherent characteristics of electron lenses the electron stream and the strength of the electron lens are varied in such a manner that the field is strongest for electrons reaching it in a path close to the lens axis and weakest for electrons which arrive in the field slightly later at increasing angles with the lens axis. The strength of the electron lens field may be varied by a suitable saw-tooth voltage. However, other methods, which in some respects are more practical from a design standpoint due to the extremely high frequency involved, will be included hereinafter. It will be apparent, however, that since a reduction in the strength of the lens field for electrons entering the outer zones of the field is desired, it is preferable to utilize those electrons which pass through the objective during the interval in which the power of the lens is decreased.

If we consider the objective lens as being substantially thin, it is possible to calculate voltage amplitude and frequency required to correct for spherical aberration in an electrostatic lens. The transit time of an electron from the intersection of the object with the lens axis to the plane of the lens is given by $$t = \frac{1}{v} \frac{f}{\cos\theta} = \sqrt{\frac{m}{2eV_0}} f \left(1 + \frac{1}{2}\theta^2 + \ldots \right) \quad (1)$$

where $f$ is the lens focal length, $V_0$ is the focusing voltage, and $m$ and $e$ are the mass and charge, respectively, of the electron. It depends on the angle of inclination $\theta$ of the electron path to the lens axis, so that the difference in time for an axial electron and a marginal electron is $$\Delta t = \frac{1}{2}\sqrt{\frac{m}{2eV_0}} f \theta^2 \quad (2)$$

The change in effective lens focal length with voltage of the center electrode of the lens to be described hereinafter, for voltages of the order of the cathode voltage, has been calculated to be $$\Delta f = 3.2 \frac{V}{V_0} f \quad (3)$$

while the spherical aberration of the same lens has been found to be $$\Delta f = 10.5\, f\theta^2 \quad (4)$$

Therefore, the required change in the center electrode voltage of the lens, as a function of the angle $\theta$ may be obtained by making these two changes in focal length equal in magnitude and opposite in sign, thereby deriving $$\Delta V = 3.3 \, V_0 \theta^2 \qquad (5)$$

This voltage change must occur during the time interval $\Delta t$ so that the rate of change of the lens center electrode voltage becomes $$\frac{dv}{dt} = \frac{\Delta V}{\Delta t} = \frac{6.6}{f}\sqrt{\frac{2eV_0}{m}} V_0 \qquad (6)$$

If, in accordance with the foregoing description, the change in lens voltage is accomplished by applying a sinusoidal voltage of frequency $F$ to the center electrode of the electron lens, the amplitude of this voltage must be $$V_{max} = \frac{6.6}{f} \frac{\sqrt{\frac{2e}{m}}}{2\pi F} V_0^{\frac{3}{2}} = \frac{6.24 \cdot 10^7}{fF} V_0^{\frac{3}{2}} \qquad (7)$$

when $f=1$ cm., $V_0=50{,}000$ volts, $F=10^{10}$ cycles per second (3 cm. wave), $V_{max}$ will equal $-70{,}000$ volts. If the frequency is lowered by a certain factor, the voltage amplitude must be increased by the corresponding factor. The frequency for optimum results will be determined by the transit time of the electrons from the object to the objective lens.

If an electromagnetic lens is utilized, correction for spherical aberration therein may be accomplished by combining a lens of the electrostatic type with the electromagnetic lens as described hereinafter.

Among the objects of the invention are to provide a method of and means for correcting electronically for the inherent spherical aberration in the electron lens. Another object of the invention is to provide a method of and means for correcting for spherical aberration inherent in electron lenses of either electromagnetic or electrostatic types. Another object of the invention is to provide a method of and means for varying continuously the effective focal length of an electron lens to compensate for the inherent aberration of such lenses to electrons entering the lens field at different distances from the lens axis. Another object of the invention is to provide a method of and means for varying the velocity of the electron stream applied to an electron lens in synchronism with a similar variation of the effective focal length of the lens. Another object is to provide a method of and means for varying in synchronism the velocity of electrons entering an electron lens and the effective focal length of the lens, at a period of the order of the transit time of the electron beam between a predetermined point on the lens axis and the plane of the electron lens.

The invention will be described by reference to the drawing of which Fig. 1 is a schematic diagram of the operation of a typical electron lens, Fig. 2 is a schematic diagram of a preferred embodiment of the invention, and Fig. 3 is a schematic diagram of a modification of the invention.

Referring to Fig. 1, the object O and a lens L, of either the electrostatic or electromagnetic type, are spaced a distance $d$ on the electron beam axis C. Electrons passing through the object O are radiated from the point $o$ to the lens L along paths represented by the lines $l_1$, $l_2$. These electrons are refracted differently by the electron lens as described heretofore, and again intersect the electron beam axis C at the points O' and O''. It is apparent that different zones of the lens L have slightly different focal lengths and that therefore electrons from a predetermined point on the object will not all be focused at the same point on the lens axis. This effect obviously produces objectionable diffusion of the image which limits the resolving power of the lens.

In Fig. 2, a typical simple electron microscope is illustrated, in which electrons from a cathode 1, which is at high negative potential, are attracted and accelerated by an anode 3, at ground potential, to irradiate the object 4. Electrons passing through the object 4 enter an aperture 14 in a special electrostatic lens comprised of an outer element 5 at ground potential and an inner element 6 at cathode potential. The electron stream is focused by the electron lens to form an image 7.

A source of ultra high frequency voltage 8 is connected to ground and to the positive terminal of the D.-C. source 10 to modulate the high negative potential connected to the center electrode 6 of the electron lens. A suitable phase adjusting device 9, which at the frequencies involved may be a line of predetermined length, is connected between the cathode 1 and the lens element 6. The center lens electrode 6 is also connected, through a variable source of bias potential 20 and a suitable phase regulator 12 to an electron beam control electrode 2 to modulate the velocity of the electron beam. It should be understood that separate sources of ultra-high frequency, if properly synchronized, in any known manner, may be used for the beam velocity modulating means and the electron lens.

The apparatus described heretofore will perform quite satisfactorily with a substantially sine wave output from the ultra high frequency source 8. However improved operation will be obtained if the ultra high frequency source produces a voltage of saw-tooth wave form as shown at 13. Considerable difficulty, however, is encountered in generating saw-tooth voltages having frequencies as high as those required.

Figure 3 is a modification of the embodiment of Fig. 2 in which the special electrostatic lens described heretofore is utilized in conjunction with a conventional electromagnetic lens 16. The electrostatic lens may precede or follow the electromagnetic lens in the electron beam path or if desired, may be constructed in any suitable form to accomplish the desired correction of spherical aberration.

The method described heretofore provides a substantially continuous electron beam the velocity of which is varied in synchronism with the variations in focusing voltage applied to the electron lens. An intermittent electron beam may be used in which the beam is emitted in short impulses (one for each cycle of the ultra high frequency voltage applied to the lens) by the use of a modulating grid or by deflecting the beam across a small opening. Either of the latter methods have the disadvantage that the average intensity of the electron beam is seriously decreased.

We claim as our invention:

1. In an electron lens including high frequency focusing potentials, the method of correcting for spherical aberration including varying the strength of the field of said lens at a period of the order of the electron transit time from the focus to the plane of said lens, and simultaneously varying the initial velocity of electrons entering said field.

2. The method described in claim 1 including varying the strength of said field and said initial electron velocity in predetermined phase relation.

3. In an electron image device having an electron objective lens and lens focusing potentials including voltages of ultra-high frequency, the method of correcting for spherical aberration of said lens including electron irradiating a specimen, focusing the electron image of said specimen to form an image, varying the strength of said lens at a rate of the order of the electron transit time from said specimen to the plane of said lens, and varying the initial velocity of said electrons in synchronism with the variation of said field strength.

4. In an electron image device having an electron objective lens and lens focusing potentials including voltages of ultra-high frequency, the method of correcting for spherical aberration of said lens including electron irradiating a specimen, focusing the electron image of said specimen to form an image, decreasing the strength of said lens at a rate of the order of the electron transit time from said specimen to the plane of said lens, and decreasing the initial velocity of said electrons in synchronism with the variation of said field strength.

5. In an electron lens including high frequency focusing potentials, the method of correcting for spherical aberration including decreasing the strength of the field of said lens at a period of the order of the electron transit time from the focus to the plane of said lens, and simultaneously decreasing the initial velocity of electrons entering said field.

6. An electron objective lens system including an object, means for varying the power of said lens at a period of the order of the electron transit time from said object to the plane of said lens, means for irradiating said object by electrons, and means for varying the velocity of said electrons in synchronism with the variations of said lens power.

7. An electron image device including an electron source, an object support, means including said source for irradiating an object supported by said object support, an electron lens, means for varying the power of said lens at a period of the order of the electron transit time from said object to the plane of said lens, means for varying the velocity of the electrons irradiating said object, and means for synchronizing the variations of said electron velocity and said lens power to correct for the inherent spherical aberration of said lens.

8. An electron objective lens system including an object support, means for decreasing the power of said lens at a period of the order of the electron transit time from said object to the plane of said lens, means for irradiating an object supported by said object support by electrons, and means for decreasing the velocity of said electrons in synchronism with the variations of said lens power.

9. An electron image device including an electron source, an object, means including said source for irradiating said object, an electron lens, means for decreasing the power of said lens at a period of the order of the electron transit time from said object to the plane of said lens, means for decreasing the velocity of the electrons irradiating said object, and means for synchronizing the variations of said electron velocity and said lens power to correct for the inherent spherical aberration of said lens.

10. Apparatus of the type described in claim 6 including means for varying said lens power and said electron velocity in predetermined phase relation.

11. Apparatus of the type described in claim 7 including means for varying said lens power and said electron velocity in predetermined phase relation.

12. Apparatus of the type described in claim 8 including means for varying said lens power and said electron velocity in predetermined phase relation.

13. Apparatus of the type described in claim 9 including means for varying said lens power and said electron velocity in predetermined phase relation.

14. An electron objective lens system including an object, means including an ultra-high frequency source of potential for varying the power of said lens at a period of the order of the electron transit time from said object to the plane of said lens, means for irradiating said object by electrons, and means including said source of potential for varying the velocity of said electrons in synchronism with the variations of said lens power.

15. An electron image device including an electron source, an object support, means including said source for irradiating an object supported by said object support, an electron lens, means including an ultra-high frequency source of potential for varying the power of said lens at a period of the order of the electron transit time from said object to the plane of said lens, means for varying the velocity of the electrons irradiating said object, and means including said source of potential for synchronizing the variations of said electron velocity and said lens power to correct for the inherent spherical aberration of said lens.

16. An electron objective lens system including an object, means for varying the power of said lens at a period of the order of the electron transit time from said object to the plane of said lens, means for irradiating said object by electrons, and means for varying the intensity of said electrons in synchronism with the variations of said lens power.

17. An electron objective lens system including an object, means including a source of potential of frequency of the order of the electron transit time between said object and said lens for varying periodically the power of said lens, means for irradiating said object by electrons, and means for varying the velocity of said electrons in synchronism with the variations of said lens power.

18. An electron image device including an electron source, an object, means including said source for irradiating said object, an electron lens, means including a source of potential of frequency of the order of the electron transit time between said object and said lens for periodically varying the power of said lens, means for varying the velocity of the electrons irradiating said object, and means for synchronizing the variations of said electron velocity and said lens power to correct for the inherent spherical aberration of said lens.

19. An electron microscope including in combinations a source of electrons, an object, means for applying said electrons to said object, an electron lens for focusing electrons from said object to form an electron image thereof, means for varying the rate of application of said electrons, and means for varying the focus of said lens at a period of the order of the electron transit time from said object to the plane of said lens thereby to obtain an image free from lens aberration.

20. Apparatus of the type described in claim 6 including a second electron lens coaxial with said first lens, and means for providing additional correction in said first lens to correct for the inherent spherical aberration of said second lens.

VLADIMIR K. ZWORYKIN.
   JAMES HILLIER.
   EDWARD G. RAMBERG.